US008266526B2

(12) United States Patent
Masuda et al.

(10) Patent No.: US 8,266,526 B2
(45) Date of Patent: Sep. 11, 2012

(54) DISTRIBUTED AND DECENTRALIZED DOCUMENT MANAGEMENT SYSTEM AND METHOD

(75) Inventors: Yoshihiro Masuda, Kanagawa (JP); Kazuhisa Ando, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1426 days.

(21) Appl. No.: 11/492,884

(22) Filed: Jul. 26, 2006

(65) Prior Publication Data
US 2007/0198487 A1    Aug. 23, 2007

(30) Foreign Application Priority Data

Feb. 14, 2006  (JP) ................................ 2006-037300

(51) Int. Cl.
*G06F 17/00* (2006.01)
(52) U.S. Cl. ............... 715/255; 340/572.4; 340/568.1; 358/1.15; 358/3.28; 358/448
(58) Field of Classification Search .............. 715/255; 340/572.4, 572.1, 568.1; 358/1.15, 3.28, 358/448
See application file for complete search history.

(56) References Cited

U.S. PATENT DOCUMENTS

| | | | |
|---|---|---|---|
| 5,745,686 A | 4/1998 | Saito et al. | |
| 6,446,093 B2* | 9/2002 | Tabuchi | 715/255 |
| 7,023,344 B2* | 4/2006 | Schaper | 340/572.4 |
| 7,088,229 B2* | 8/2006 | Johnson | 340/505 |
| 7,129,840 B2* | 10/2006 | Hull et al. | 340/568.1 |
| 7,298,511 B2* | 11/2007 | Lay et al. | 358/1.15 |
| 7,327,259 B2* | 2/2008 | Kim et al. | 340/572.1 |
| 7,357,300 B2* | 4/2008 | Hull et al. | 235/376 |
| 7,437,668 B2* | 10/2008 | Slein | 715/255 |
| 7,660,021 B2* | 2/2010 | Gotou et al. | 358/3.28 |
| 7,746,490 B2* | 6/2010 | Sawada | 358/1.14 |
| 7,904,424 B2* | 3/2011 | Yoshida | 707/638 |
| 2001/0042075 A1* | 11/2001 | Tabuchi | 707/500 |
| 2003/0035539 A1* | 2/2003 | Thaxton | 380/51 |
| 2004/0021708 A1* | 2/2004 | Lay et al. | 347/5 |
| 2004/0041707 A1* | 3/2004 | Hull et al. | 340/568.1 |
| 2004/0141200 A1* | 7/2004 | Minami et al. | 358/1.15 |
| 2005/0063011 A1* | 3/2005 | Sawada | 358/1.18 |

(Continued)

FOREIGN PATENT DOCUMENTS

JP    A-9-54735    2/1997
(Continued)

OTHER PUBLICATIONS

Office Action issued in Japanese Patent Application No. 2006-037300 dispatched on Nov. 2, 2010 (w/English translation).

*Primary Examiner* — Doug Hutton, Jr.
*Assistant Examiner* — Benjamin Smith
(74) *Attorney, Agent, or Firm* — Oliff & Berridge, PLC

(57) ABSTRACT

A document management system includes a memory portion that stores an original document identifier and a first derived document identifier in association with a second apparatus identifier, the original document identifier being provided to an original document, the first derived document identifier being provided to a first derived document created when the original document is copied, printed, edited, or sent by a first apparatus, the second apparatus identifier being provided to a second apparatus that further copies, prints, edits, or sends the first derived document; and a search portion that searches for a distribution path of the original document with the use of the association of the original document identifier, the first derived document identifier, and the second apparatus identifier.

6 Claims, 18 Drawing Sheets

U.S. PATENT DOCUMENTS

| | | | |
|---|---|---|---|
| 2005/0168769 A1* | 8/2005 | Kim et al. | 358/1.14 |
| 2005/0174601 A1* | 8/2005 | Sawada | 358/1.15 |
| 2005/0182757 A1* | 8/2005 | Hull et al. | 707/3 |
| 2005/0219616 A1* | 10/2005 | Furuta et al. | 358/1.18 |
| 2005/0270577 A1* | 12/2005 | Lapstun et al. | 358/1.15 |
| 2006/0017950 A1* | 1/2006 | Ikegami et al. | 358/1.13 |
| 2006/0050309 A1* | 3/2006 | Someya | 358/1.15 |
| 2006/0076399 A1* | 4/2006 | Imine et al. | 235/375 |
| 2006/0092024 A1* | 5/2006 | Kim et al. | 340/572.1 |
| 2006/0209351 A1* | 9/2006 | Saito | 358/3.28 |
| 2006/0227365 A1* | 10/2006 | Hohensee et al. | 358/1.15 |
| 2006/0227366 A1* | 10/2006 | Hohensee et al. | 358/1.15 |
| 2006/0253894 A1* | 11/2006 | Bookman et al. | 726/2 |
| 2006/0294152 A1* | 12/2006 | Kawabe et al. | 707/200 |
| 2007/0083381 A1* | 4/2007 | Farrell et al. | 705/1 |
| 2007/0133063 A1* | 6/2007 | Harrington | 358/403 |
| 2008/0212129 A1* | 9/2008 | Yoshiida | 358/1.15 |
| 2008/0272585 A1* | 11/2008 | Conard et al. | 283/67 |
| 2012/0105901 A1* | 5/2012 | Miyazaki et al. | 358/1.14 |

FOREIGN PATENT DOCUMENTS

| | | |
|---|---|---|
| JP | A 11-249777 | 9/1999 |
| JP | A 11-259459 | 9/1999 |
| JP | A-2001-23297 | 1/2001 |
| JP | A 2004-72343 | 3/2004 |
| JP | A 2004-102627 | 4/2004 |
| JP | A 2005-35095 | 2/2005 |

* cited by examiner

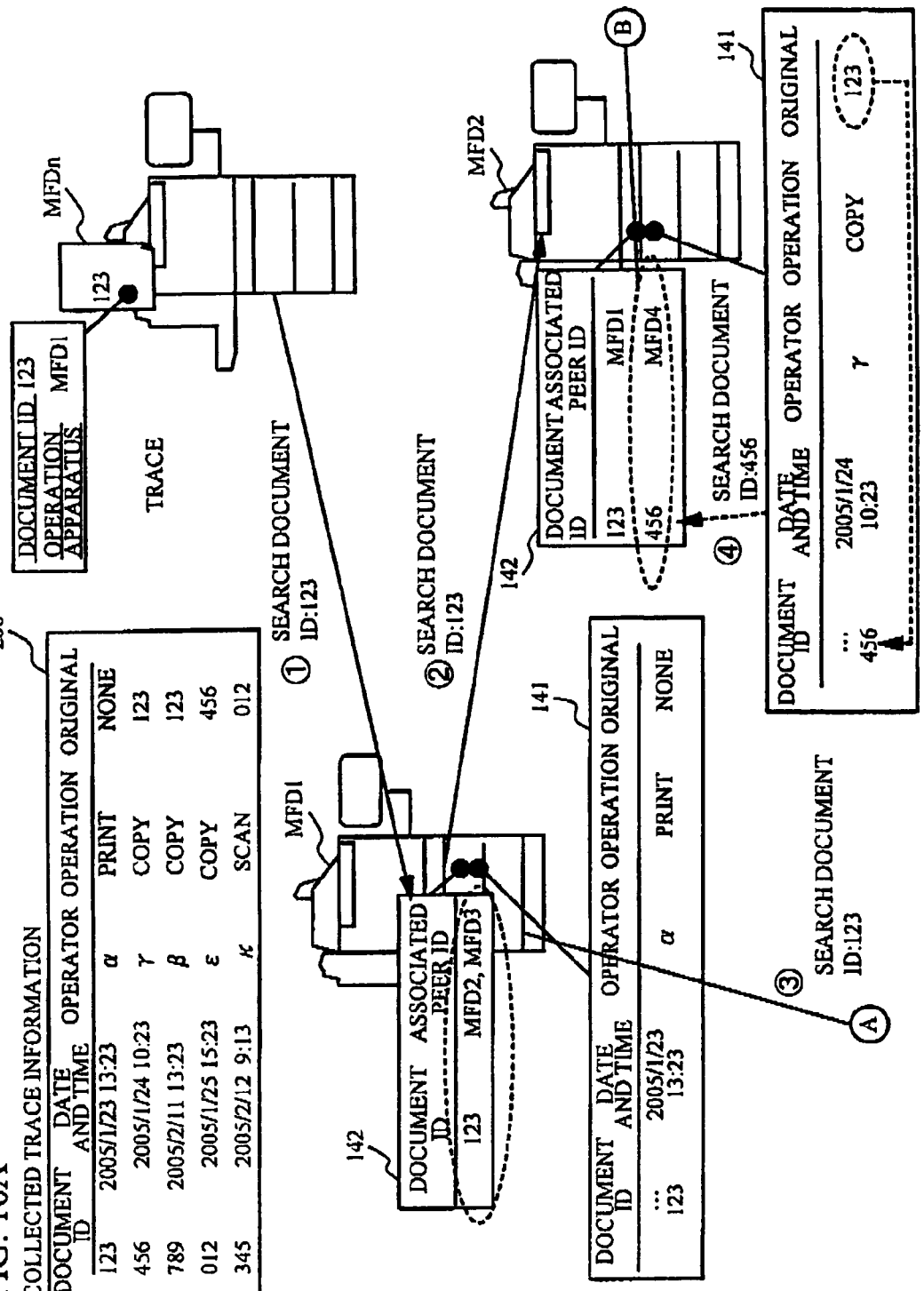

DISTRIBUTED AND DECENTRALIZED DOCUMENT MANAGEMENT SYSTEM AND METHOD

BACKGROUND

1. Technical Field

This invention relates to a document management system and a document management method.

2. Related Art

In recent years, interest in how to assure security of information assets has been increased both in individuals and business enterprises. As one of the methods to assure security thereof, there has been proposed a technique for managing printed paper documents and the like by a central server. There has been proposed another technique for making individual paper documents retain attribute information instead of managing printed paper documents by a central server. According to other techniques, unauthorized copying can be prevented and a copy document can be traced. An interrelation among multiple copy documents can be known. The document is managed by using a sheet with a wireless tag embedded.

SUMMARY

An aspect of the present invention provides a document management system including: a memory portion that stores an original document identifier and a first derived document identifier in association with a second apparatus identifier, the original document identifier being provided to an original document, the first derived document identifier being provided to a first derived document created when the original document is copied, printed, edited, or sent by a first apparatus, the second apparatus identifier being provided to a second apparatus that further copies, prints, edits, or sends the first derived document; and a search portion that searches for a distribution path of the original document with the use of the association of the original document identifier, the first derived document identifier, and the second apparatus identifier.

BRIEF DESCRIPTION OF THE DRAWINGS

Embodiments of the present invention will be described in detail based on the following figures, wherein:

FIGS. 10A through 10C are views showing a processing course of collecting (trace) operation events;

DETAILED DESCRIPTION

Figure 1:
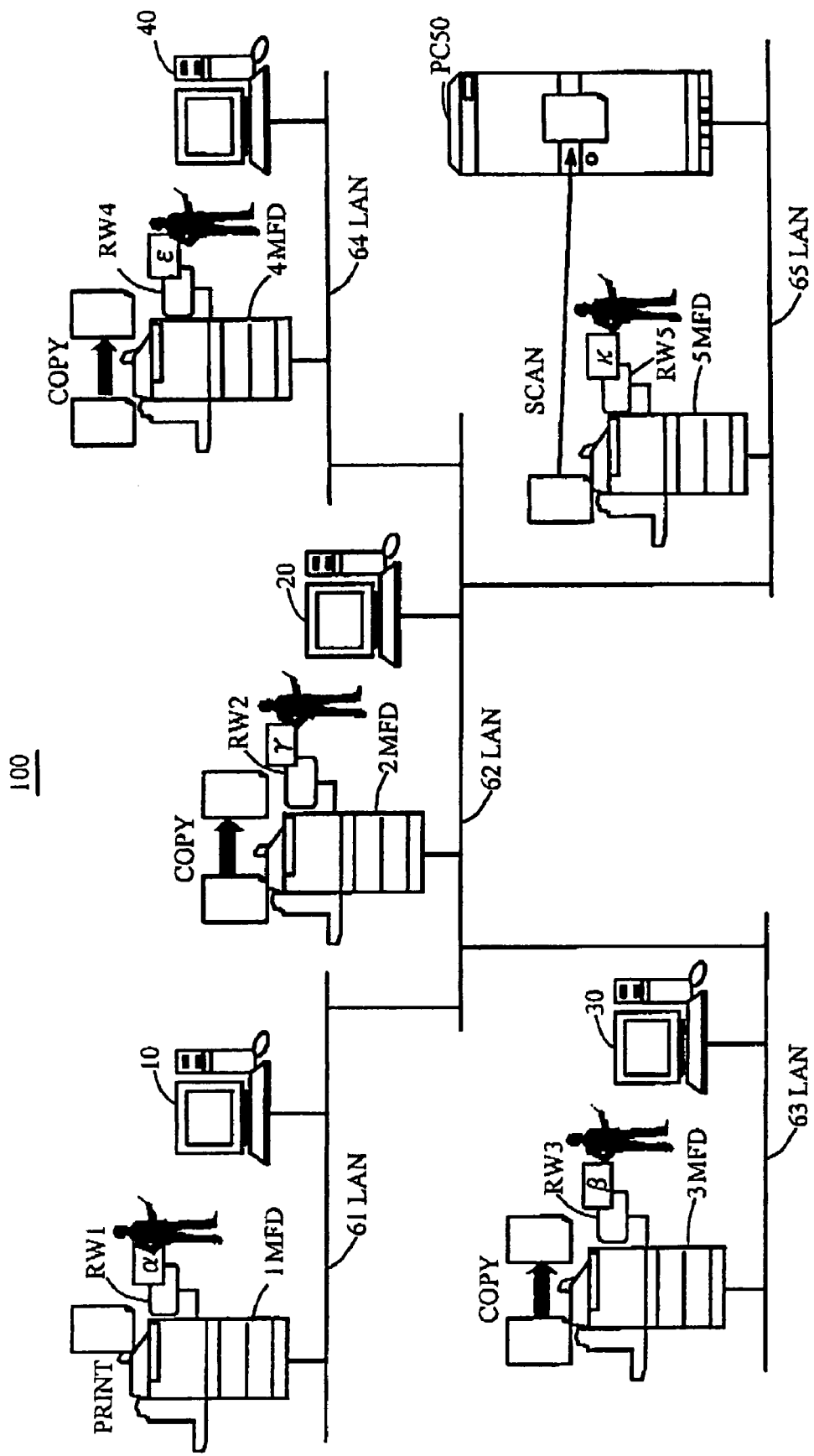
FIG. 1 is a view showing a structure of a system in accordance with an exemplary embodiment of the invention.

A description will now be given of exemplary embodiments of the invention. FIG. 1 is a view showing a structure of a system in accordance with an exemplary embodiment of the invention. As shown in FIG. 1, a document management system 100 includes multiple Multi Functional Devices (MFDs) 1 through 5 and multiple personal computers (PCs) 10 through 50. The respective MFDs 1 through 5 and the respective PCs 10 through 50 are connected to each other via LANs 61 through 65. Further, the respective LANs 61 through 65 are connected to each other to enable data communication. The respective MFDs 1 through 5 include ID card reader/writer RWs 1 through 5.

The document management system 100 is intended to search for a distribution path of a document. The document management system 100 is provided for tracing a history of operations (printing, copying, scanning, FAX and the like) for a paper document on the MFDs 1 through 5, which are realized on a peer-to-peer (P2P) framework. An electronic document retains an unique "document ID (document identifier)" provided when the electronic document is created and an address ("operation apparatus address (apparatus identifier)") of an MFD which executes an input/output operation (printing, scanning or the like) for the document as attribute information of the electronic document. For a paper document, a unique "document ID" provided when outputted and an address of an MFD which outputs (copies, prints or the like) the document are outputted as readable code information. Here, as a method of recording the code information on the paper document, it can be thought that a method of printing in an optically readable form such as QR (Quick Response) code, a method of writing into an RFID (Radio Frequency Identification) tag which is previously infiltered in the paper and the like.

In the document management system 100, an address of one of the MFDs 1 through 5 which has executed an input/output operation is embedded as code information in a paper document outputted by being copied, printed, edited, or sent and an electronic document created by being scanned. When the document is operated on another MFD, a fact that the document is operated on another MFD is notified to the MFD address embedded in the paper document as the code information. Thus, the association of the document is retained between the MFDs interactively to form a P2P network. When a trace request a document is issued, the document is traced by tracing the P2P network.

More specifically, when a user executes an operation (copying, scanning or the like) by inputting a paper document on one of the MFDs 1 through 5, code information composed of a document ID and an MFD address provided to the inputted paper document is recognized. Information on "operation name", "date and time" of an operation executed on the MFD, and if copied, information on an "original document ID" are recorded as an "operation event" in association with the document ID. Concurrently, the MFD address recorded on the paper document is added and registered to a linkage apparatus address group retained by the MFD in association with the document ID.

Further, an address of the MFD on which the operation is executed is notified to the MFD represented by the MFD address. The address of the MFD on which the operation is executed is added to the linkage apparatus address group retained by the MFD that receives the notification, in association with the document ID (addition of backward link). When a paper document is newly outputted in the operation on the foregoing MFD (copying or the like), a new document ID and the address of the MFD on which the operation is executed are outputted as code information on the paper document. When a new electronic document is created and saved as a result of the foregoing operation (in the case of scanning), a new document ID and the address of the MFD on which the operation is executed are set as the attribute information of the electronic document. When a trace request for a document is issued, the document is traced by tracing the P2P network.

By the document management system 100, history information is saved in a distributed and decentralized manner on the multiple MFDs 1 through 5. Therefore, distribution paths of documents can be traced among business enterprises and organizations which cannot be managed by a central server. Further, a paper document and an electronic document can be traced only by retaining a document ID of the document and an address of an MFD on which the document is created. Therefore, it is not necessary to provide a rewritable memory to a paper document. A description will be hereinafter given more specifically.

Figure 2:
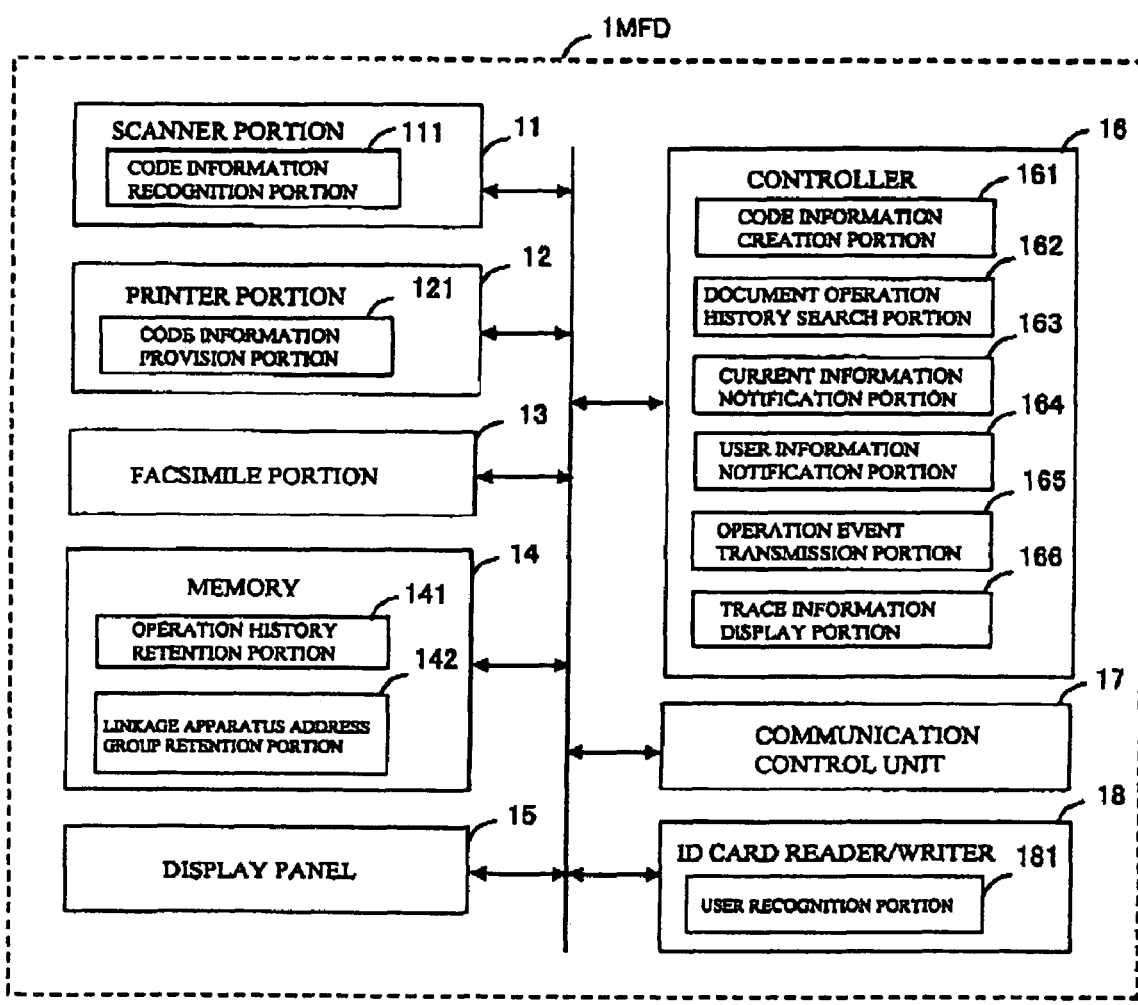
FIG. 2 is a diagram showing a structure of an MFD 1 in accordance with the exemplary embodiment of the invention.
Figure 3:
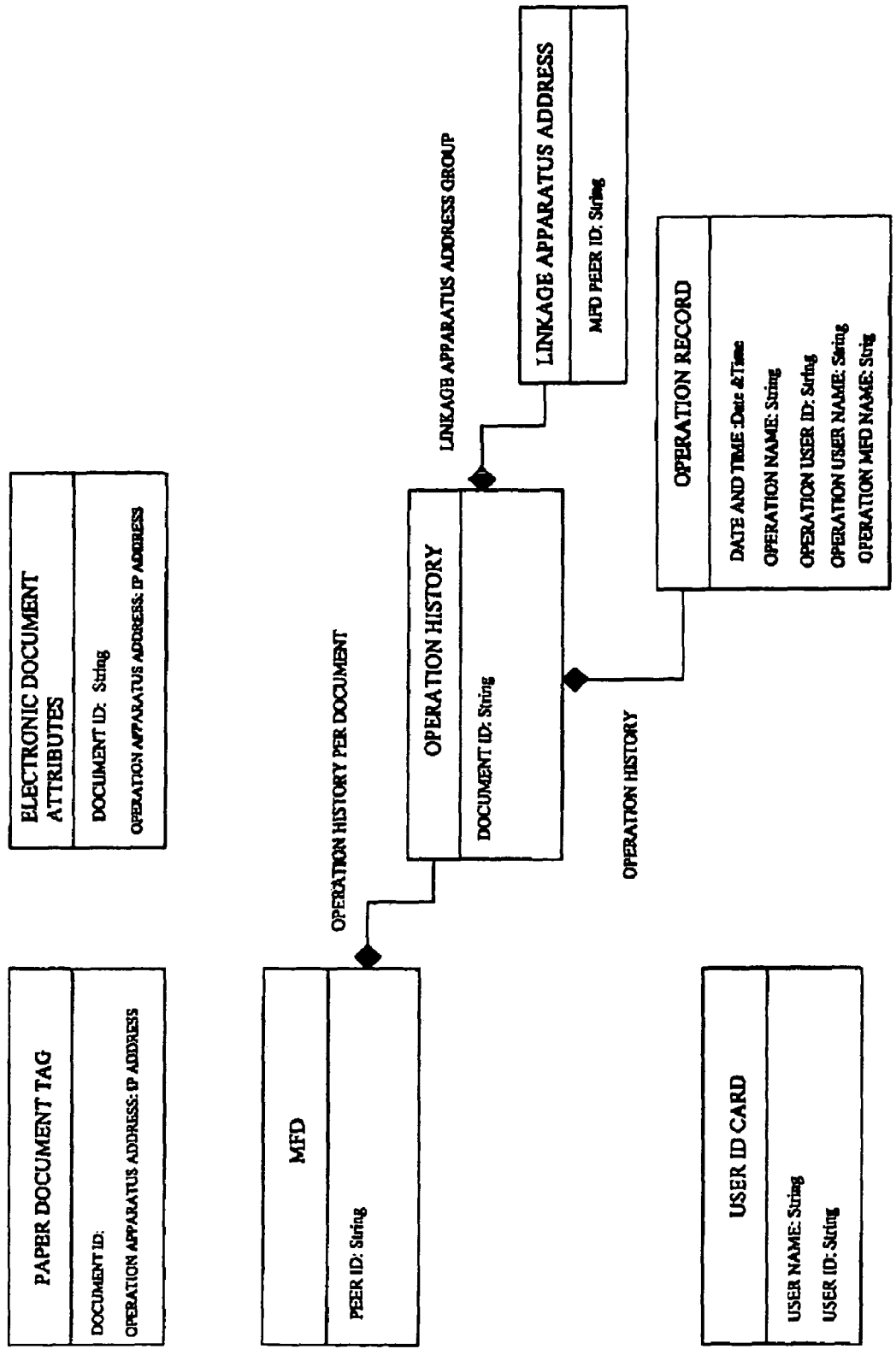
FIG. 3 is a diagram showing a data structure of data processed by a document management system.

Next, a structure of the MFD will be described. FIG. 2 is a diagram showing a structure of the MFD 1 in accordance with an exemplary embodiment of the invention. FIG. 3 is a diagram showing a data structure of data processed in the document management system 100. Since structures of other MFOs are similar to that of the MFD 1, the same reference numerals will be used in other MFDs. As shown in FIG. 2, the MFD 1 has a scanner portion 11, a printer portion 12, a facsimile portion 13, a memory 14, a display panel 15, a controller 16, a communication control unit 17, and an ID card reader/writer 18.

The scanner portion 11 reads an image recorded on a document. A document image is read by the scanner portion 11 when a document is copied. Further, the scanner portion 11 also functions as a code information recognition portion 111. The code information recognition portion 111 is composed of a section that optically reads code information printed on a paper document. The code information recognition portion 111 recognizes a document ID printed on the paper document and an ID of an MFD which outputs the paper document. When the code information is stored in a paper document with an ID tag embedded therein, the code information recognition portion 111 is composed of a section that can read information of the ID tag.

The printer portion 12 records an electrostatic latent image on a photo conductor, develops the electrostatic latent image by using a monochrome toner or a color toner, transcribes the developed image on a recording paper which is then outputted. The printer portion 12 functions as a code information provision portion 121. The code information provision portion 121 provides code information composed of a document ID and an MFD address to a copy document. Here, the code information provision portion 121 provides the code information to a document by printing the code information on a paper document. When the document is a paper document with an ID tag embedded therein, the code information provision portion 121 provides the code information to the document by storing the code information in the ID tag. A method of providing the code information by the code information provision portion 121 is not limited thereto.

The facsimile portion 13 transmits and receives facsimile telegrams. The memory 14 stores image data read by the scanner portion 11, image data received via the network, FAX-received telegram data, and the like. Further, the memory 14 also functions as an operation history retention portion 141 and a linkage apparatus address group retention portion 142. The operation history retention portion 141 retains operation histories of paper documents on a document basis. The operation history retention portion 141 stores an original document ID provided to an original document and an address of an MFD on which a copy document is further copied in association with each other. An operation history of a paper document includes information such as date and time when an original document is copied, an ID of a person who copies the original document, and an operation type conducted by the person who copies the original document. The history information retained by the operation history retention portion 141 is regularly backed up mutually between the MFD 1 and a given number of other MFDs. Thereby, even when the data is lost or the MFD 1 is replaced, the history information can be searched without trouble.

The linkage apparatus address group retention portion 142 retains an address group of apparatuses on which operations are conducted for a document in the course of distributing the document. The linkage apparatus address group retention portion 142 stores a copy document ID provided to a copy document when a document is copied and an address of an MFD on which the copy document is further copied in association with each other. The display panel 15 displays an operation screen having an icon and inputs operation information by touching the icon.

The controller 16 controls the MFD 1 as a whole. The controller 16 functions as a code information creation portion 161, a document operation history search portion 162, a current information notification portion 163, a user information notification portion 164, an operation event transmission portion 165, and a trace information display portion 166.

When a document is copied, the code information creation portion 161 creates a new document ID and an address of the MFD 1, which are provided to a document to be printed. The document operation history search portion 162 searches for a distribution path of a document by utilizing the association of an original document ID, a copy document ID, and an MFD address. The document operation 162 issues a search request for a document designated by a user to an apparatus identified by an MFD address retained by the linkage apparatus address group retention portion 142. When receiving a search request from other MFD, the document operation history search portion 162 answers an operation history retained by itself to the questioner MFD. Thereby, the document operation history search portion 162 searches for a distribution path of a document by tracing an apparatus identified by an MFD address. For example, the document operation history search portion 162 can search for a distribution path of an original document by tracing from a document ID to a copy document ID and an MFD address.

When an operation is enacted, the current information notification portion 163 notifies a document ID and an address of an MFD on which a document is copied to an apparatus identified by an address of an MFD on which an original document is outputted. When a document is copied on an MFD, the current information notification portion 163 receives a copy document ID and an address of the MFD. When the document operation history search portion 162 searches for information, the current information notification portion 163 notifies the information in the operation history retention portion 141 to a search requester.

When an original document is copied on the MFD 1, the user information notification portion 164 notifies such a result to a given user. Specifically, when an operation is executed for a paper document on the MFD 2, the user information notification portion 164 selectively notifies such an operation to users involved in a distribution of the document such as a user who creates the document or a user who copies the document, by e-mail, instant messaging or the like.

When an operation is executed for a document on the MFD 1, the operation event transmission portion 165 notifies such an operation to users to be notified set in association with the document by e-mail, instant messaging or the like. The respective MFDs 1 through 5 retain information on a group to which the MFDs 1 through 5 belong. In automatic transmission of an operation event, when an operation is executed on an MFD outside the group, the operation event transmission portion 165 may selectively notify such an operation to users involved in distribution of the document by e-mail, instant messaging or the like.

Information on copiable duration or copy prohibition duration is provided in advance to a Read-Only region of the code information retained by a paper document. In automatic transmission of an operation event, when it is found that an operation is executed on the MFD 1 after the copiable duration expires or an operation is executed on the MFD 1 during the copy prohibition duration by checking the duration information, the operation event transmission portion 165 may selectively notify such an event to users involved in distribution of the document by e-mail, instant messaging or the like. The trace information display portion 166 displays a search result obtained by the document operation history search portion 162.

The communication control unit 17 communicates with apparatuses connected to the network. The ID card reader/writer 18 is intended to read and write an ID card belonging to a user, and functions as a user recognition portion 181 that recognizes a user who utilizes the MFD 1. The user recognition portion 181 accumulates information on a user obtained by an ID card in the operation history retention portion 141 as the history information. A biological authentication may be used for authentication by the user recognition portion 181. By recognizing a user as described above, user information can be provided to the operation history, and an operator can be identified in tracing. By managing an operation session in operating an MFD (from login to logout), documents operated in the same operation session can be extracted.

Figure 4:
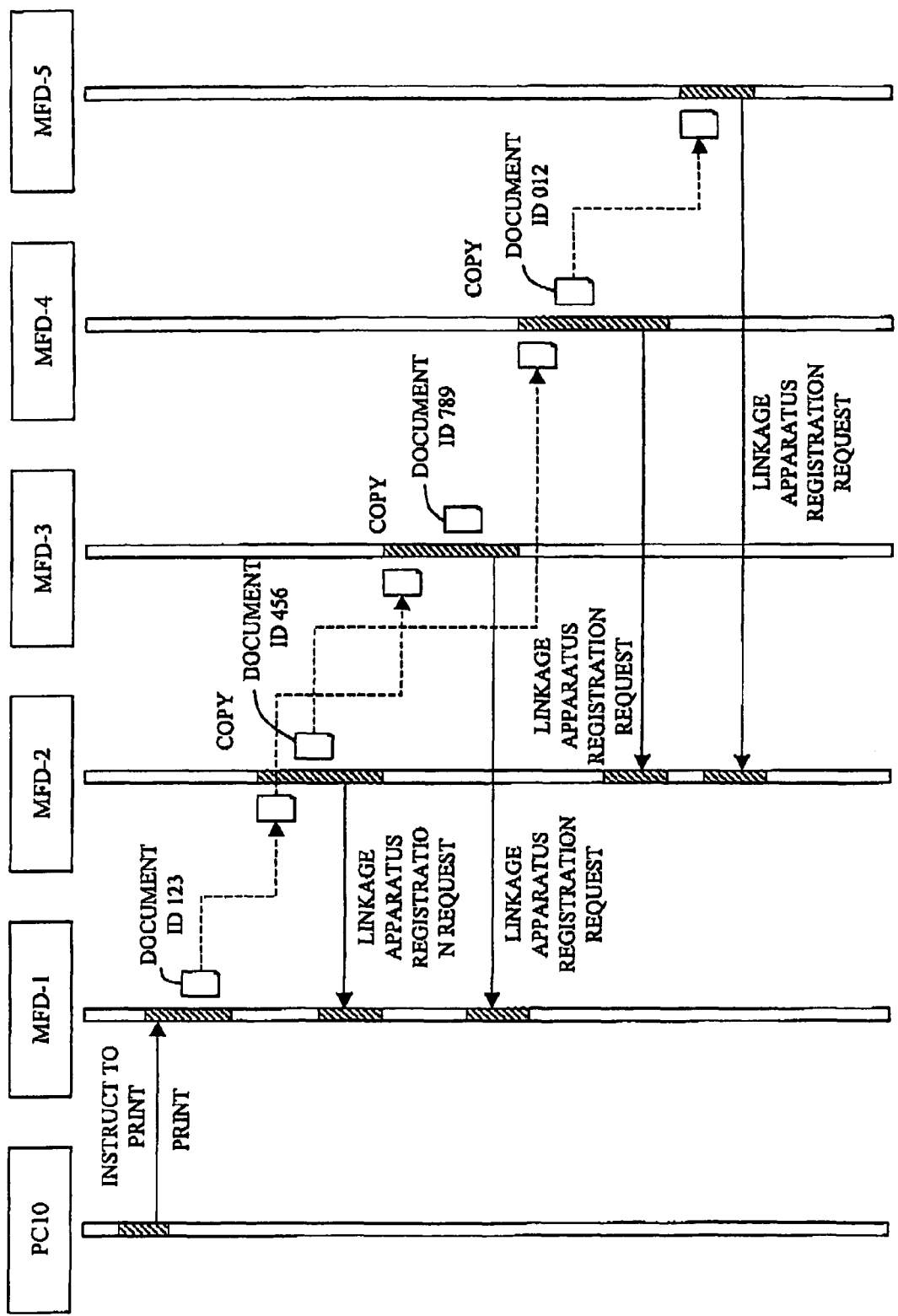
FIG. 4 is an event diagram of document distribution.
Figure 5A:
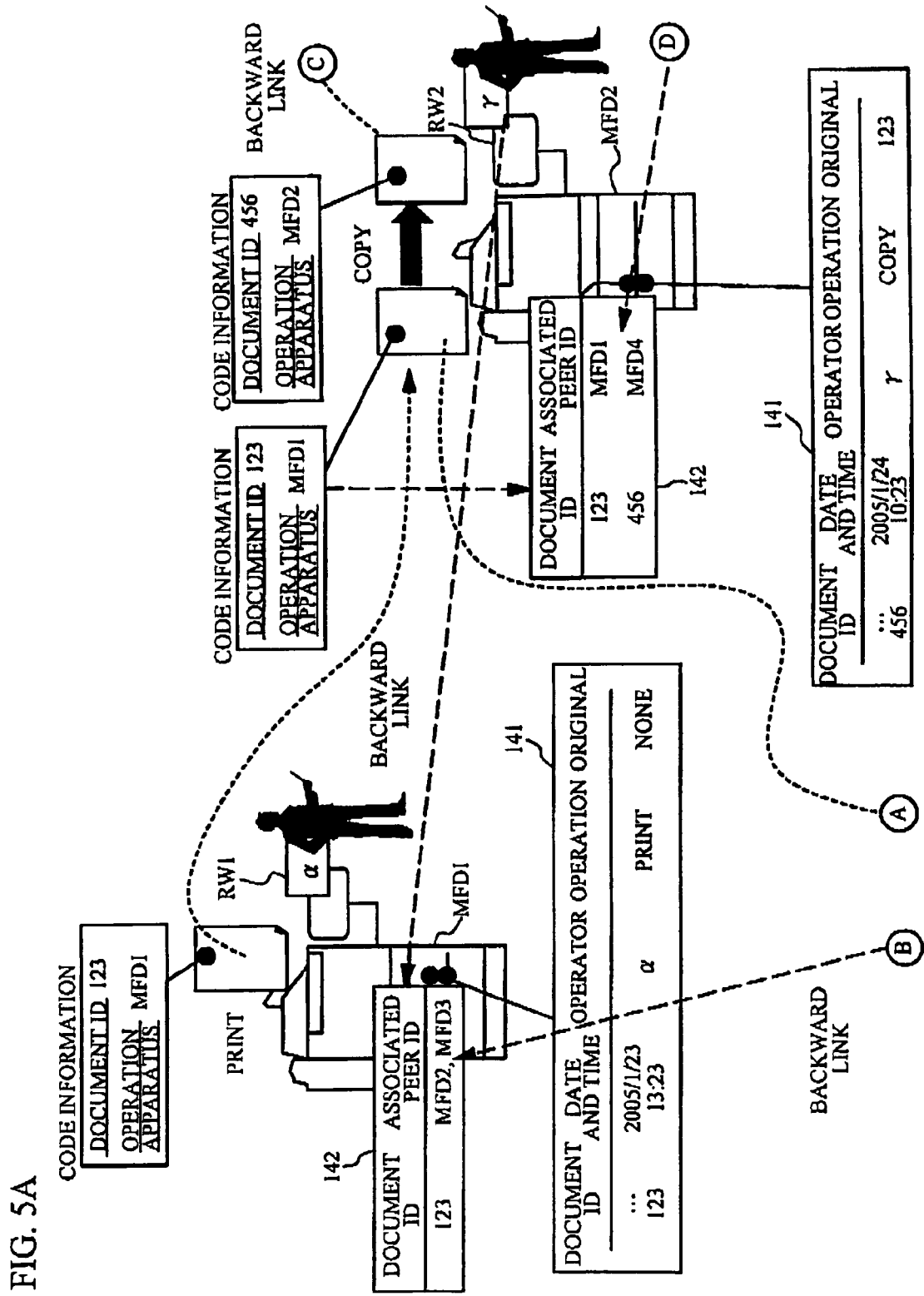
FIGS. 5A through 5C are views showing a processing course of accumulating operation events.
Figure 5B:
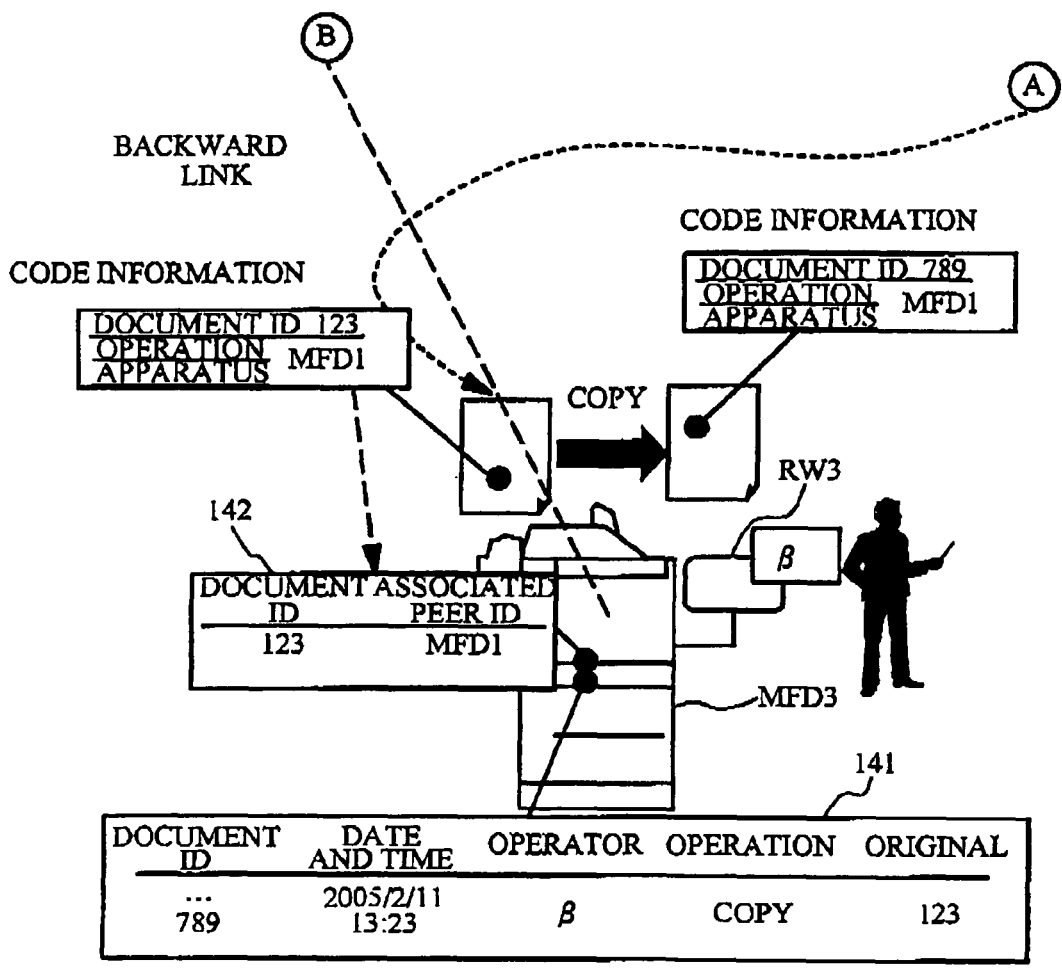
Figure 5C:
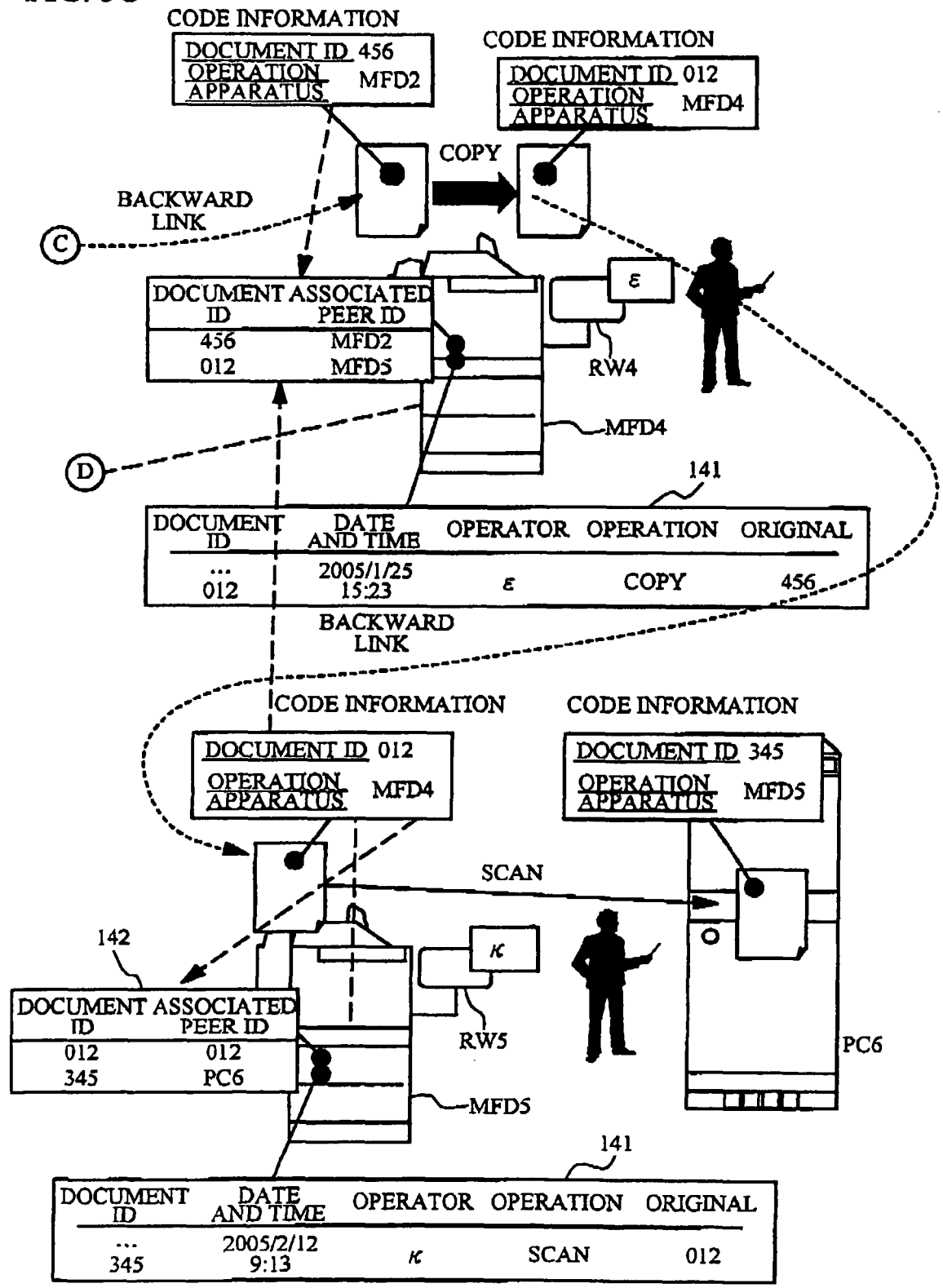
Figure 6:
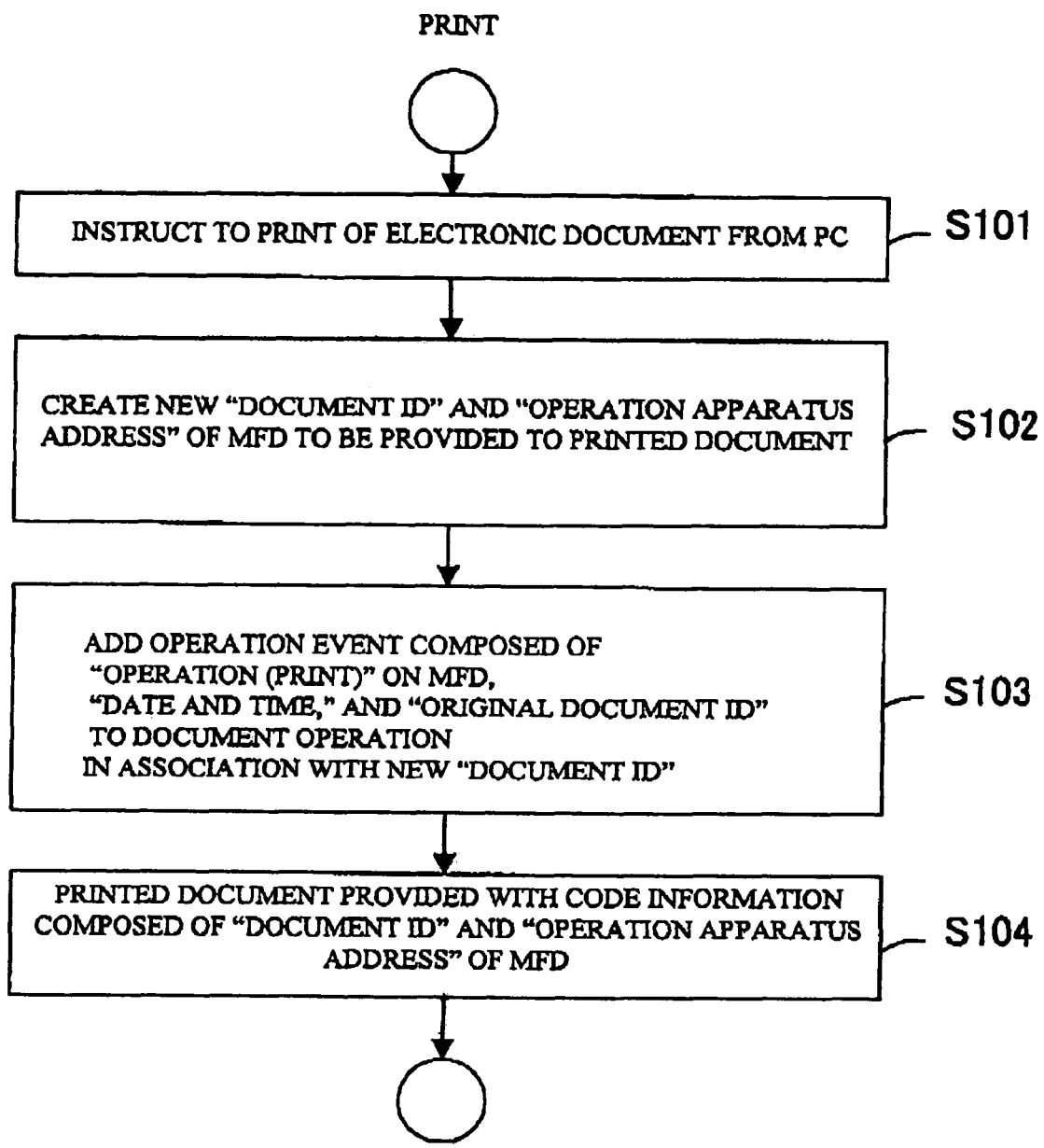
FIG. 6 is a processing flowchart of accumulating operation events in the case of printing.

FIG. 4 is an event diagram of document distribution. FIGS. 5A through 5C are views showing a processing course of accumulating operation events. Firstly, a description will be given of processing of the MFD 1. FIG. 6 is a processing flowchart of accumulating operation events in the case of printing. Printing an electronic document is directed from the PC 10 to the MFD 1 (step S101). The code information creation portion 161 of the MFD 1 creates a new document ID 123 and an address of the MFD 1 to be provided to a printed document (step S102). The controller 16 of the MFD 1 adds an operation event composed of the operation (printing) on the MFD 1, date and time, and an original document ID (none) to a document operation history in association with the new document ID 123 (step S103). The printer portion 12 of the MFD 1 prints the printed document provided with code information composed of the document ID 123 and the address of the MFD 1 (step S104).

Figure 7:
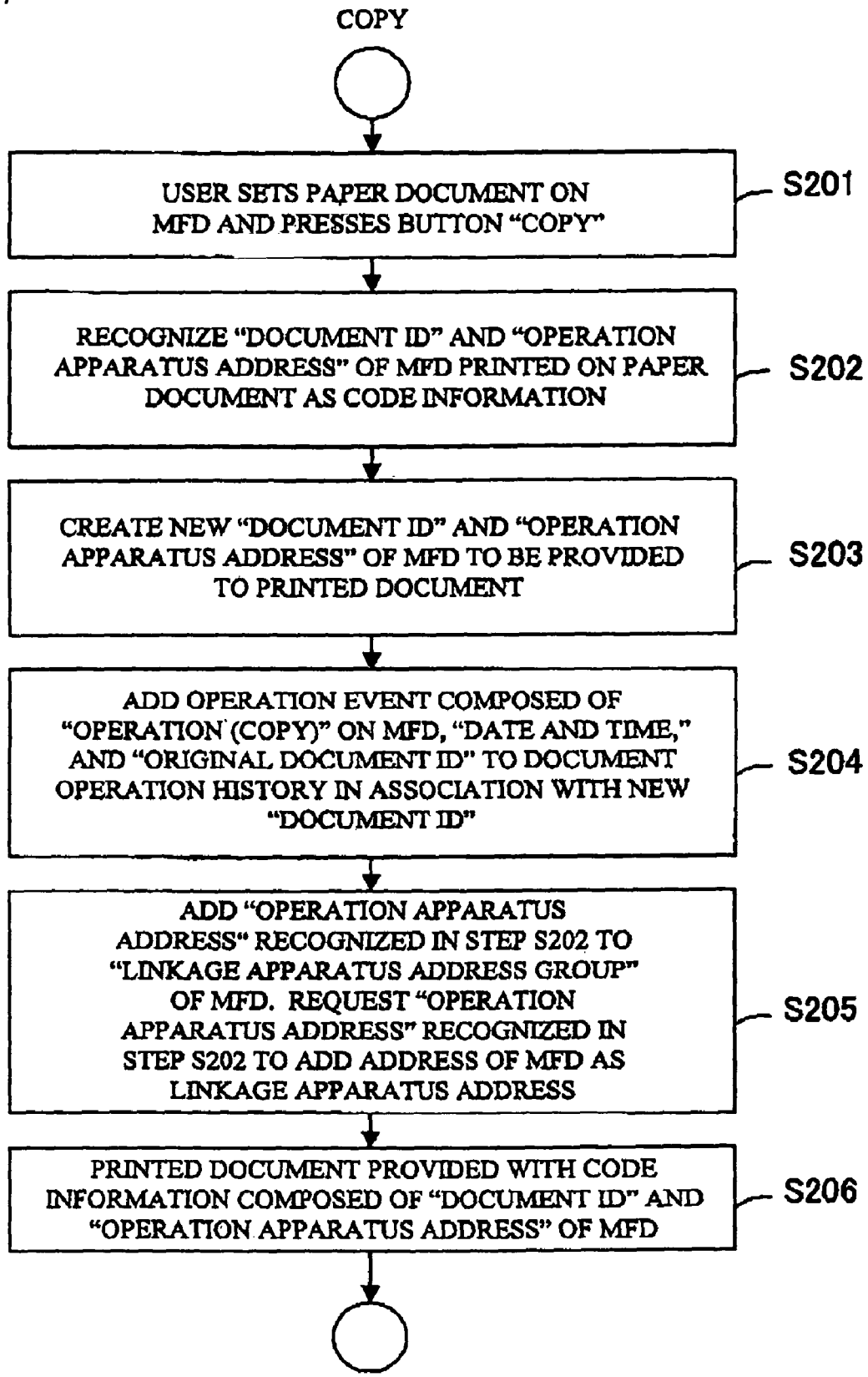
FIG. 7 is a processing flowchart of accumulating operation events in the case of copying.

Next, a description will be given of processing of the MFD 2. FIG. 7 is a processing flowchart of accumulating operation events in the case of copy. A user sets a paper document on the MFD 2 and presses a button "copy" (step S201). The code information recognition portion 111 of the MFD 2 recognizes the "document ID 123" and the address of the MFD 1, which is printed as the code information on the paper document based on a scanned image (step S202). The code information creation portion 161 of the MFD 2 creates a new document ID 456 and an address of the MFD 2 to be provided to a printed document (step S203). The controller 16 of the MFD 2 adds an operation event composed of the operation (copying) on the MFD 2, date and time, and the original document ID 123 to the document operation history in association with the new document ID 456 (step S204).

The controller 16 of the MFD 2 adds the MFD address recognized in step S202 to a linkage apparatus address group of the MFD 2. The controller 16 of the MFD 2 requests the MFD address recognized in step S202 to add the address of the MFD 2 as a linkage apparatus address (step S205). The printer portion 12 of the MFD 2 prints the printed document provided with code information composed of the document ID 456 and the address of the MFD 2 (step S206).

Figure 8:
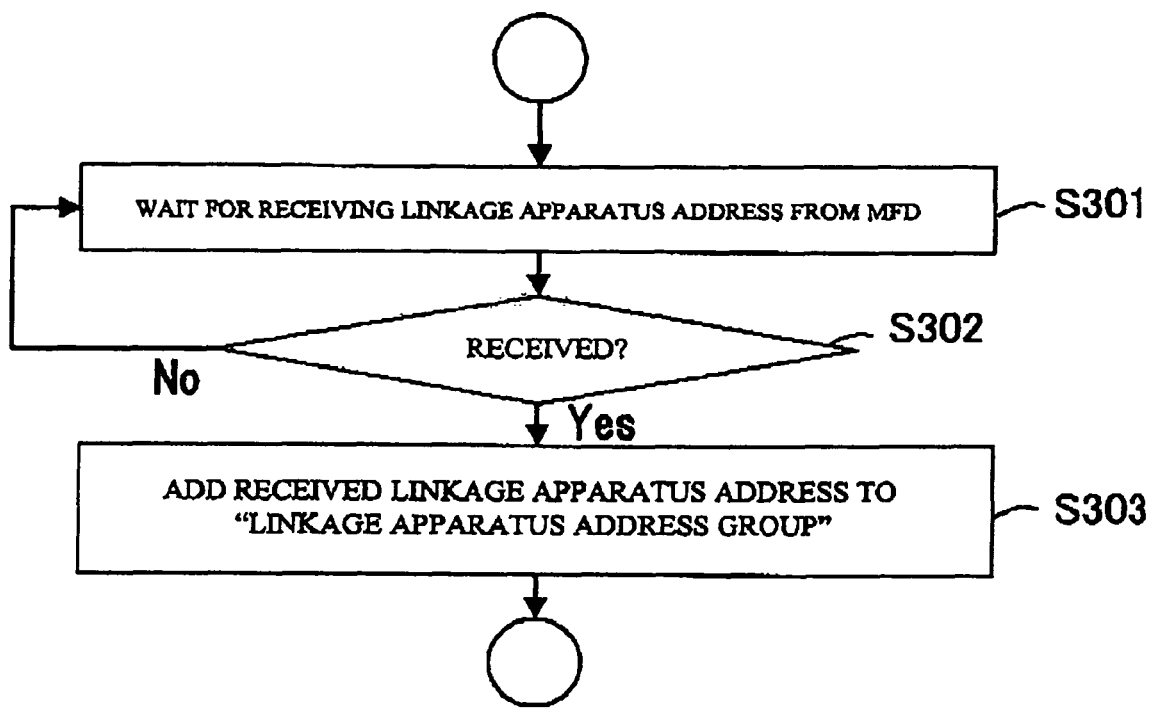
FIG. 8 is a processing flowchart of accumulating operation events when an MFD receives a linkage apparatus address.

FIG. 8 is a processing flowchart of accumulating operation events when an MFD receives a linkage apparatus address. The controller 16 of the MFD 1 waits for receiving an MFD address from another MFD (step S301). When the controller 16 of the MFD 1 receives the address of the MFD 2 from the MFD 2 (step S302), the controller 16 of the MFD 1 adds the received address of the MFD 2 to the "linkage apparatus address group" (step S303). Thereby, a first derived document identifier ID 456 and the MFD 2 identifier are stored in association with the original document identifier ID 123.

Next, a description will be given of processing of the MFD 3. With reference to FIG. 7 again, a user sets a paper document on the MFD 3 and presses the button "copy" (step S201). The code information recognition portion 111 of the MFD 3 recognizes the "document ID 123" and the address of the MFD 1, which are printed as code information on the paper document based on a scanned image (step S202). The code information creation portion 161 of the MFD 3 creates a new document ID 789 and an address of the MFD 3 to be provided to a printed document. The controller 16 of the MFD 3 adds an operation event composed of the operation (copy) on the MFD 3, date and time, and the original document ID 123 to the document operation history correspondingly to the new document ID 789 (step S204).

The controller 16 of the MFD 3 adds the address of the MFD 1 recognized in step S202 to a linkage apparatus address group of the MFD 3. The current information notification portion 163 of the MFD 3 requests the address of the MFD 1 recognized in step S202 to add the address of the MFD 3 as a linkage apparatus address (step S205). The printer portion 12 of the MFD 3 prints the printed document provided with code information composed of the document ID 789 and the address of the MFD 3 (step S206).

With reference to FIG. 8 again, the controller 16 of the MFD 1 waits for receiving an MFD address from other MFD (stop S301). When the controller 16 of the MFD 1 receives the address of the MFD 3 from the MFD 3 (step S302), the controller 16 of the MFD 1 adds the received address of the MFD 3 to the "linkage apparatus address group" (step S303).

Next, a description will be given of processing of the MFD 4. With reference to FIG. 7 again, a user sets a paper document on the MFD 4 and press the button "copy" (step S201). The code information recognition portion 111 of the MFD 4 recognizes the "document ID 456" and the address of the MFD 2, which are printed as code information on the paper document based on a scanned image (step S202). The code information creation portion 161 of the MFD 4 creates a new document ID 012 and an address of the MFD 4 to be provided to a printed document. The controller 16 of the MFD 4 adds an operation event composed of the operation (copy) on the MFD 4, date and time, and the original document ID 456 to the document operation history in association with the new document ID 012 (step S204).

The controller 16 of the MFD 4 adds the address of the MFD 2 recognized in step S202 to a linkage apparatus address group of the MFD 4. The current information notification portion 163 of the MFD 4 requests the address of the MFD 2 recognized in step S202 to add the address of the MFD 4 to the linkage apparatus address group (step S205). The printer portion 12 of the MFD 4 prints the printed document provided with code information composed of the document ID 012 and the address of the MFD 4 (step S206).

With reference to FIG. 8 again, the controller 16 of the MFD 2 waits for receiving an MFD address from other MFD (step S301). When the controller 16 of the MFD 2 receives the address of the MFD 4 from the MFD 4 (step S332), the controller 16 of the MFD 2 adds the received address of the MFD 4 to the linkage apparatus address group (step S303).

Figure 9:
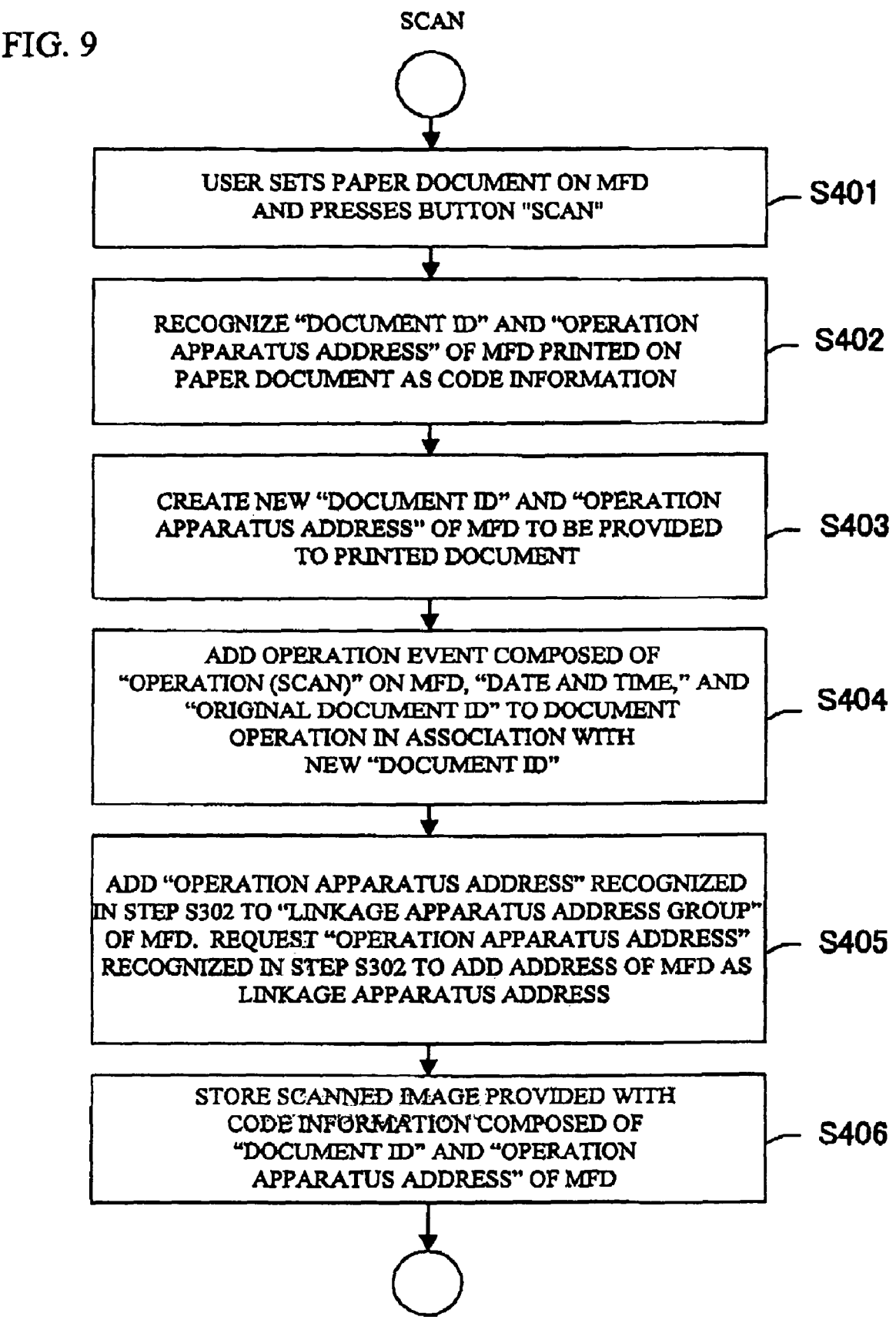
FIG. 9 is a processing flowchart of accumulating operation events in the case of scanning.

Next, a description will be given of processing of the MFD 5. FIG. 9 is a processing flowchart of accumulating operation events in the case of scanning. A user sets a paper document on the MFD 5 and press the button "scan" (step S401). The code information recognition portion 111 of the MFD 5 recognizes the document ID 012 and the address of the MFD 4, which are printed as code information on the paper document based on a scanned image (step S402). The code information creation portion 161 of the MFD 5 creates a new document ID 345 and an address of the MFD 5 to be provided to a printed document (step S403). The controller 16 of the MFD 5 adds an operation event composed of the operation (scanning) on the MFD 5, date and time, and the original document ID 012 to the document operation history correspondingly to the new document ID 345 (step S404).

The controller 16 of the MFD 5 adds the address of the MFD recognized in step S402 to a linkage apparatus address group of the MFD 5. The current information notification portion 163 of the MFD 5 requests the address of the MFD 4 recognized in step S402 to add the address of the MFD 5 to the linkage apparatus address group (step S405). The controller 16 of the MFD 5 stores a scanned image provided with code information composed of the document ID 345 and the address of the MFD 5 (step S406).

In FIG. 8, the controller 16 of the MFD 4 waits for receiving an MFD address from other MFD (step S301). When the controller 16 of the MFD 4 receives the address of the MFD 5 from the MFD 5 (step S302), the controller 16 of the MFD 4 adds the received address of the MFD 5 to the linkage apparatus address group (step S303).

Figure 10B:
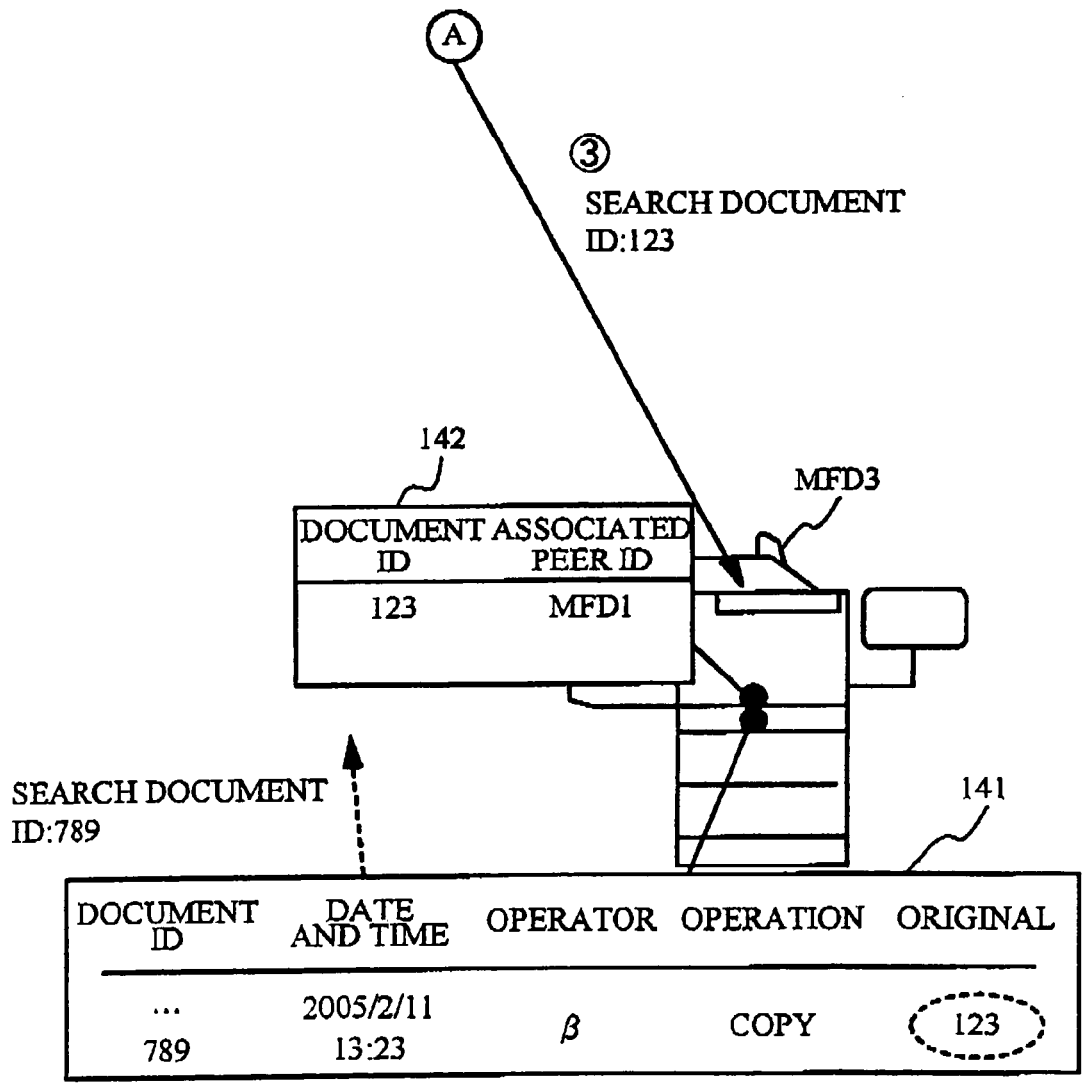
Figure 10C:
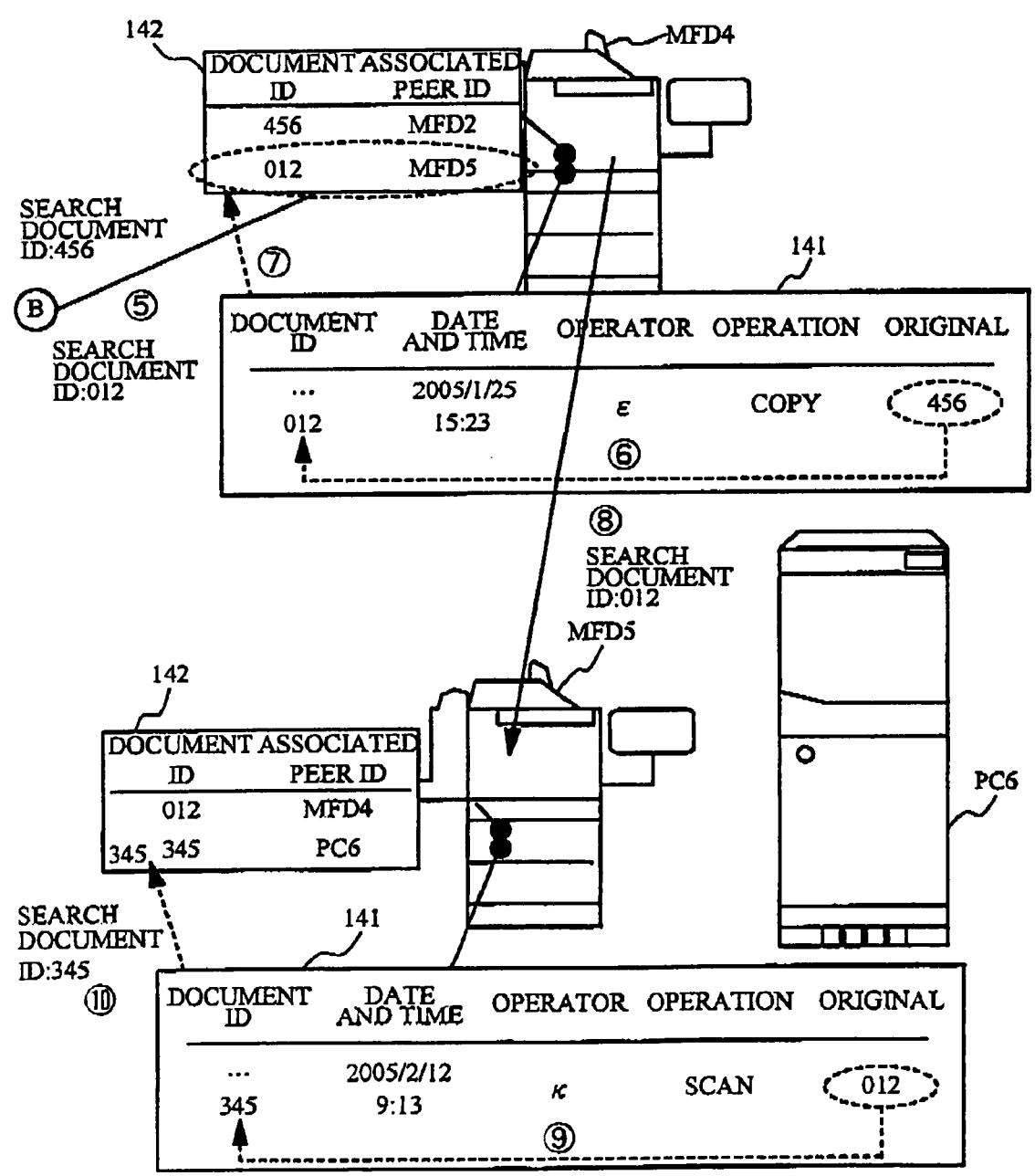
Figure 11:
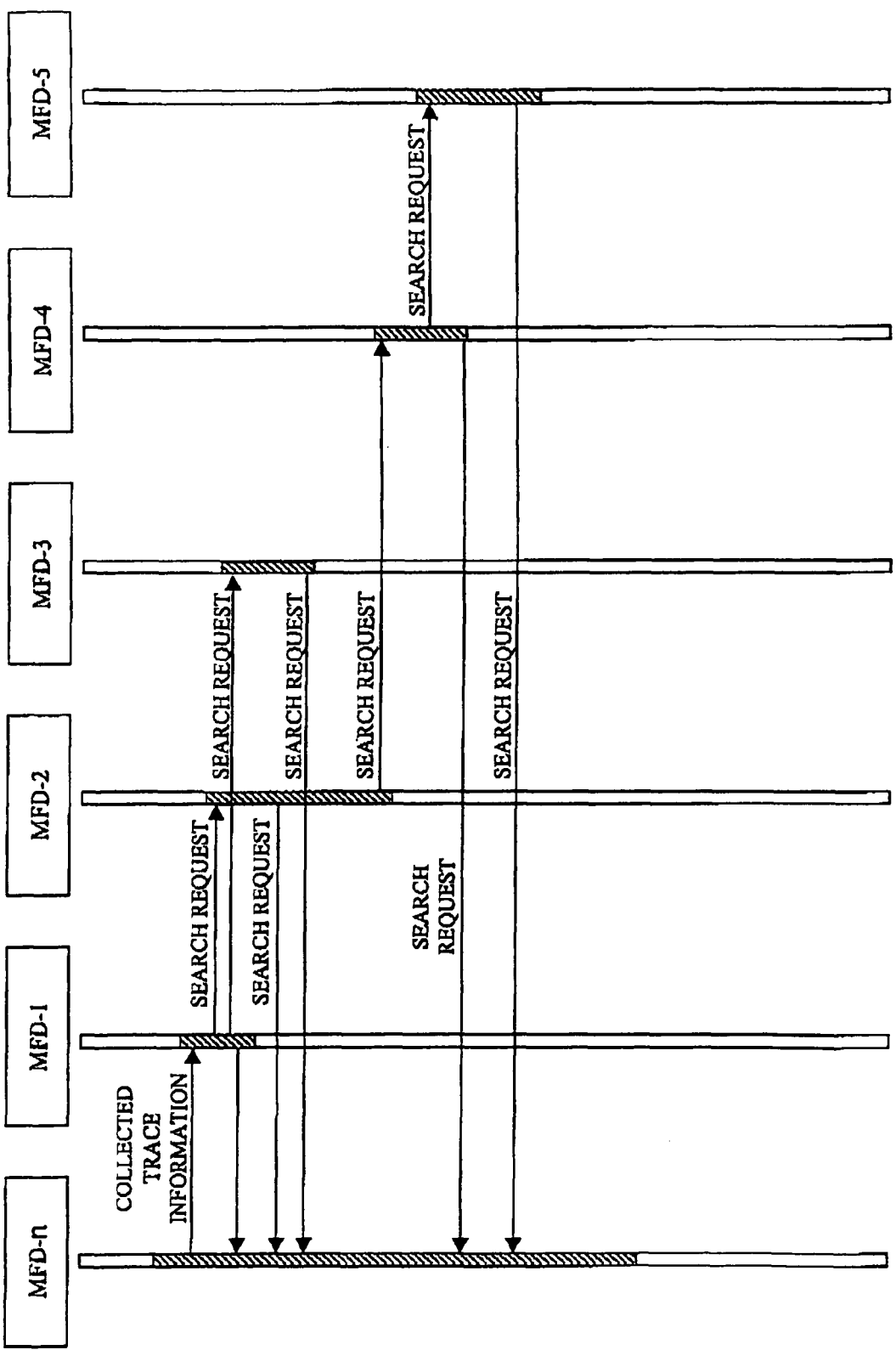
FIG. 11 is an event diagram of tracing a document.

FIGS. 10A through 10C are views showing a processing course of collecting operation events. FIG. 11 is an event diagram of tracing a document. Here, searching is conducted by making an MFDn recognize a document. When trace information of a document is obtained, the document is recognized on an MFDn, and a search result is displayed on the screen belonging to the MFDn, or is outputted on papers. A description will be given specifically below. When a user traces information on an operation history of a document, the user makes an MFDn recognize code information printed on a paper document. Then, a search request for the operation history of the document is issued to an MFD expressed by an MFD address included in the code information.

The respective MFDs 1 through 5 are always in a state of waiting for receiving the foregoing search request. Upon receiving the search request, the respective MFDs 1 through 5 search for an operation history retained by itself for a document ID of the search target, extracts information of the operation history of the document ID, and returns a search result thereof to the MFDn to be reported which firstly issues the search request. In such searching, tracing is conducted not only by tracing the document as a trace target, but also by tracing an original document before copying the document as the trace target which is retained by an original document ID retained by each entry in the operation history.

Further, an information provision request (search request) of an operation history of a document ID is sent to an MFD address group included in the "linkage apparatus address group" retained in association with the document of the respective MFDs 1 through 5. A search request is transmitted in a similar manner, and a search result is returned to the search request side. In the MFDn that firstly issues the search request, by viewing the operation history returned from the respective MFDs 1 through 5 through the foregoing course, a trace state of the document can be extracted. A description will be given in detail.

Figure 12:
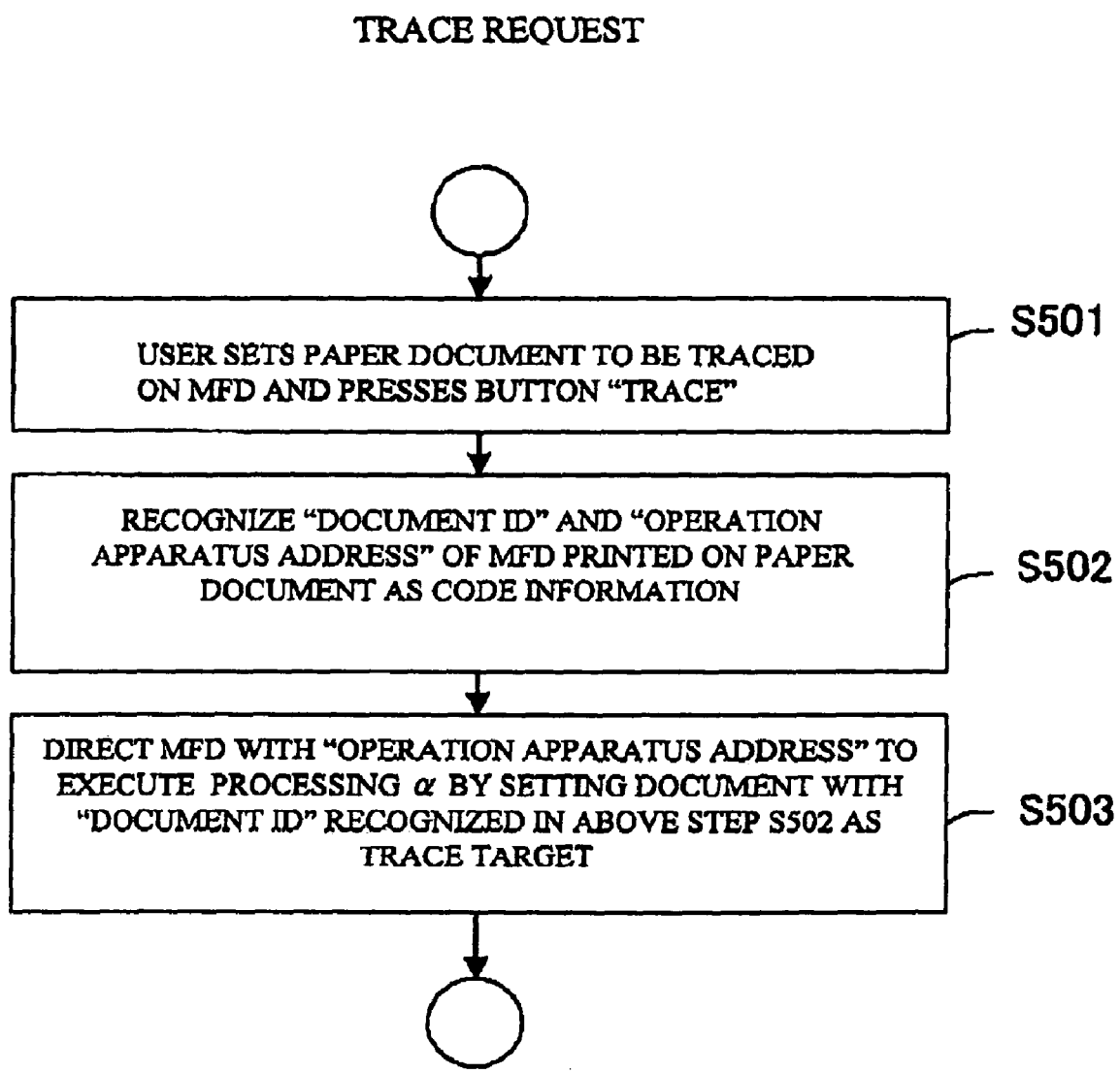
FIG. 12 is a flowchart in the case of trace request.

FIG. 12 is a flowchart when there is a trace request. First, a user sets a paper document to be traced on an MFDn, and presses the button, "trace" (step S501). The code information recognition portion 111 of the MFDn recognizes the document ID 123 and the address of the MFD, "MFD 1" which are printed on the paper document as code information (step S502). The document operation history search portion 162 of the MFDn issues a trace instruction to the MFD with address of "MFD 1" to execute processing a of FIG. 13 by setting the document with the document ID 123 of steps S502 as a trace target (step S503).

Figure 13:
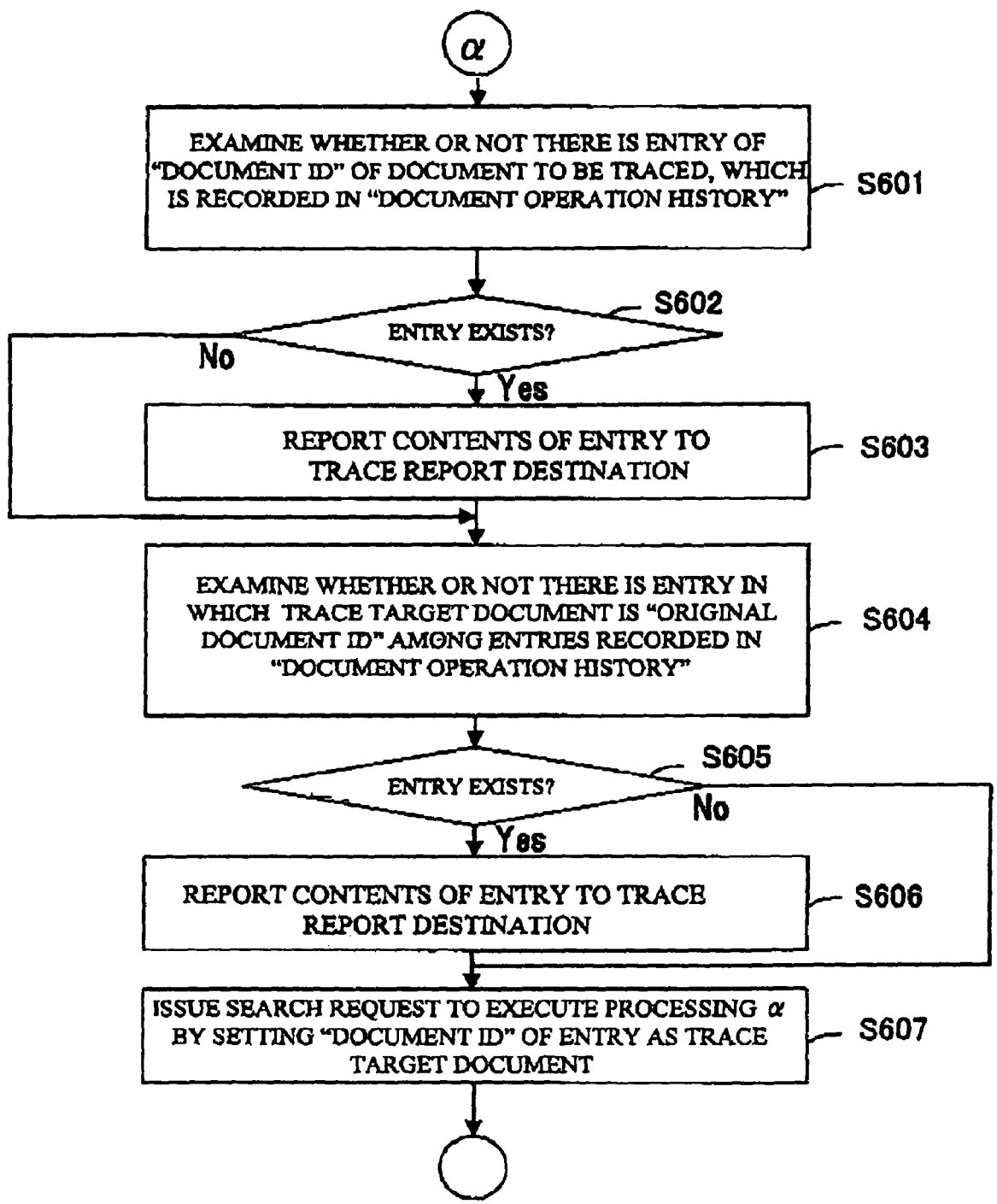
FIG. 13 is a flowchart in the case of trace search.

Next, a description will be given of processing in trace search by the MFD 1. FIG. 13 is a flowchart in trace search. When the document operation history search portion 162 of the MFD 1 receives the trace instruction from the MFDn, the document operation history search portion 162 examines whether or not there is an entry of the "document ID 123" of the tracing target document, which is recorded in the "operation history" of the operation history retention portion 141 of the MFD 1 (step S601). When there is an entry of the "document ID 123" (step S602), the document operation history search portion 162 of the MFD 1 reports contents of the entry as a search result to the MFDn as a trace report destination (step S603).

Next, the document operation history search portion 162 of the MFD 1 examines whether or not there is an entry in which the "document ID 123" which is the trace target document is an "original document ID" among the entries recorded in the "operation history" (step S604). When there is no entry in which the "document ID 123" is the "original document ID" (step S605), the document operation history search portion 162 of the MFD 1 refers to the linkage apparatus address group of the linkage apparatus address group retention portion 142, and issues a search request to the MFD 2 and the MFD 3 to execute the processing a by setting the "document ID 123" of the entry as a trace target document (step S607).

Next, a description will be given of processing in trace search by the MFD 2. When the document operation history search portion 162 of the MFD 2 receives the search request from the MFD 1, the document operation history search portion 162 of the MFD 2 examines whether or not there is an entry in which the "document ID 123" which is the trace target document is an "original document ID" among the entries recorded in the "operation history" of the operation history retention portion 141 of the MFD 2 (step S604). When there is an entry in which the "document ID 123" is the "original document ID" (step S605), the document operation history search portion 162 of the MFD 2 reports the contents of the entry to the MFDn which is a trace report destination (step S606), refers to the linkage apparatus address group of the linkage apparatus address group retention portion 142 of the MFD 2, and issues a search request to the MFD 4 to execute the processing a of FIG. 13 by setting the "document ID 456" of the entry as a trace target document (step S607).

Next, a description will be given of processing in trace search by the MFD 3. When the document operation history search portion 162 of the MFD 3 receives the search request from the MFD 1, the document operation history search portion 162 of the MFD 3 examines whether or not there is an entry in which the "document ID 123" which is the trace target document is an "original document ID" among the entries recorded in the "operation history" of the operation history retention portion 141 of the MFD 3 (step S604). When there is an entry in which the "document ID 123" is the "original document ID" (step S605), the document operation history search portion 162 of the MFD 3 reports the contents of the entry to the MFDn which is a trace report destination (step S606), refers to the linkage apparatus address group of the linkage apparatus address group retention portion 142. Since there is no associated peer in which the "document ID 789" of the entry can be a trace target document, a search request to execute the processing a of FIG. 13 is not issued (step S607).

Next, a description will be given of processing in the trace search by the MFD 4. The document operation history search portion 162 of the MFD 4 examines whether or not there is an entry in which the "document ID 456" that is the trace target document is an "original document ID" among the entries recorded in the "operation history" of the operation history retention portion 141 of the MFD 4 (step S604). When there is an entry in which the "document ID 456" is the "original document ID" (step S605), the document operation history search portion 162 of the MFD 4 reports the contents of the entry to the MFDn of a trace report destination (step S606), refers to the linkage apparatus address group of the linkage apparatus address group retention portion 142 of the MFD 4, and issues a search request to the MFD 5 to execute the processing α of FIG. 13 by setting the "document ID 012" of the entry as a trace target document (step S607).

Next, a description will be given of processing in trace search by the MFD 5. When the document operation history search portion 162 of the MFD 5 receives the search request from the MFD 4, the document operation history search portion 5 of the MFD 5 examines whether or not there is an entry in which the "document ID 012" of the trace target document is an "original document ID" among the entries recorded in the "operation history" of the operation history retention portion 141 of the MFD 5 (step S604). When there is an entry in which the "document ID 012" is the "original document ID" (step 5605), the document operation history search portion 162 of the MFD 5 reports the contents of the entry to the MFDn which is the trace report destination (step S606), refers to the linkage apparatus address group of the linkage apparatus address group retention portion 142 of the MFD 5, and executes the processing a of FIG. 13 by setting the "document ID 345" of the entry as a trace target document (step S607).

Figure 14:
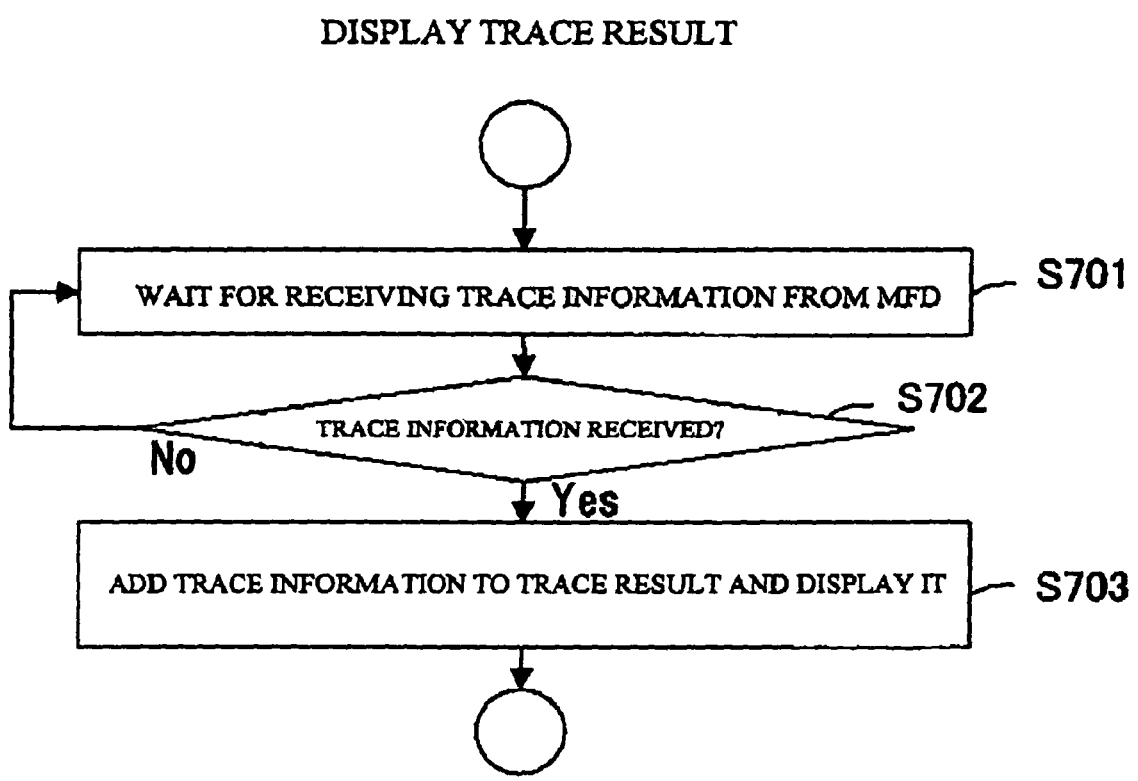
FIG. 14 is a flowchart in the case of displaying a trace result.

FIG. 14 is a flowchart of displaying a trace result. The MFDn waits for receiving the trace information from the MFDs 1 to MFD 5 (step S701). When the MFDn receives the trace information (step S702), such trace information is added to the trace result and displayed (step S703). Reference numeral 200 of FIGS. 10A through 10C represents collected trace information.

The respective MFDs 1 through n can trace a current operation state. When an operation is executed for a document on one of the MFDs 1 through n, a search request for a current state is issued together with a document identifier to an MFD identified by an MFD address included in the code information recorded on the paper document. In the MFD that receives the search request, the search request is passed on to the respective MFDs in the address group of other MFDs that have executed operations for the document, which is retained in association with the document identifier. In result, when trace information on a designated document is searched for, not only the past operation history but also the current operation state can be searched. Thereby, a result of an operation executed on one of an MFD 1 through n is notified to MFDs on which an operation is conducted in the past which retains a past history event of the document. Therefore, not only the past document history but also the current distribution course thereof can be traced.

In accordance with the foregoing exemplary embodiments, an operation history of a document can be traced by searching among the individual MFDs instead of central management by a central server. Therefore, for a designated document, it is possible to know the history of the distribution path from creation thereof to the stage that the document reaches even in document distribution among business enterprises and organizations. Further, history information can be managed in a decentralized manner among business enterprises and organizations. Further, a distribution course in an actual space of a paper document forms the peer-to-peer network among the MFDs 1 through n. Therefore, as compared to searching the whole network as a general peer-to-peer performs, information on a document history can be traced and obtained at a high speed.

In the foregoing exemplary embodiment, the example of tracing the MFDs 1 through n has been described. However, the invention is not limited thereto, and the invention can be applied to the case of a trace operation on a PC. Therefore, while a document is a paper document that has been described in the foregoing exemplary embodiment, the invention can be applied to the case where a document is an electronic document. Therefore, the term, "copy" includes not only copying by a copying machine, but also a concept of copying an electronic document on an electronic computer such as a PC.

Specifically, a PC used by an individual retains information on an operation history, and tracking an electronic document is enabled for operations executed on the PC (copying a document on the desktop, distributing a document by E-mail). When an electronic document is copied on a PC, as an "original document ID" of an attribute of a newly created electronic document, an address of the PC is registered in "recent operation apparatus address" and a copy source document ID. Further, as history data retained by each PC, date and time when the copy operation is executed, a user thereof, and the copy source document ID are registered. Meanwhile, when an electronic document is distributed by E-mail, a PC address is registered in a "recent operation apparatus address" of attribute information of the electronic document, and the electronic document is sent. When a receiving side receives the electronic document, the address of the PC that sends the electronic document included in the "recent operation apparatus address" is registered in a "linkage apparatus address group."

By independently retaining history information, disaster tolerance and security safety of the history information can be secured. "History information" and "linkage apparatus address groups" respectively retained by the MFDs 1 through 5 are accumulated in a server (not shown) independent of the MFDs 1 through 5. The server may be arranged in a manner of one-to-one in relation to the MFDs 1 through 5. Otherwise, the history information of the multiple MFDs 1 through 5 may be accumulated in one server. However, searching is conducted in the form of peer-to-peer in which the MFDs 1 through 5 respectively serve as peers.

Further, the linkage between history information servers may be made by setting a local history information server (not shown) as code information of a paper document. Specifically, an operation history of a document conducted on the MFDs 1 through 5 and the PCs 10 through 50 is reported to and accumulated in a server (not shown) arranged in a local area network. In addition, an address of the history information server is set in a "recent operation apparatus address" in code information retained by the document, instead of an address of one of the MFDs 1 through 5 or one of the PCs 10 through 50 on which an operation for the document is conducted. When an operation is conducted on an apparatus arranged in another local area network, an address of a history information server arranged in the local area network is set in the "recent operation apparatus address." Thereby, by setting the peer-to-peer relation between the history information servers instead of the peer-to-peer relation between operation apparatuses such as the MFDs 1 through 5 and the PCs 10 through 50, the search is enabled.

Further, when an MFD that instructs searching does not retain the history information, trace is realized by inquiring an associated peer MFD. When the trace information is searched from an MFD and the MFD does not have the document history information, an inquiry is issued to an address of an MFD on which the operation is executed in the past, which is included in code information on the document. Thereby, the trace information can be acquired from a given MFD.

Further, users authorized to trace information may be limited. Information of users authorized to acquire trace information is included in code information provided to a document. Thereby, the trace information of the document can be acquired by only the authorized users.

Further, the MFDs 1 through n respectively acquire the trace information of documents operated by an identical user in an identical session. When operations are executed for multiple documents in a state where a user is authenticated, documents operated in an identical login session are associated with each other. By tracing such an association, tracing and accessing the documents utilized in the identical login session are conducted.

Further, a document may be outputted from the trace information. That is, when a document is operated on the MFDs 1 through n, a scanned image of the document is saved and reference information of the saved image information is retained as a history. When the trace information is acquired, the document is printed based on the reference information of the document included in the trace information.

Further, the MFDs 1 through n provide a document search service as an application service. Such a document search service is provided as a document trace service. By recognizing the code information on a document on a PC owned by an individual or the MFDs 1 through n, an inquiry is made from a trace service on the Internet to the MFDs 1 through n included in the code information, and users receive a report on a search result returned from the MFDs 1 through n collectively.

The foregoing document management system 100 may include an index server (not shown) commonly provided to business enterprises so that a place of history information can be searched for. A paper document only retains a "document ID." When an operation is executed on one of the respective MFDs 1 through n, an address of such one of the MFDs 1 through n is notified to the index server and saved therein in association with the document ID. In tracing a document, an inquiry is issued from one of the MFDs 1 through n on which tracing the document is executed to the index server, an address of an MFD retaining the document history which is retained by the index server is acquired. The MFD that requests the search issues a search request for history information on the document to such operation apparatuses. The respective apparatuses receiving the search request return search results to the apparatus that has issued the search request. In the above structure, it is not necessary that a paper document act as an agency for a search path. However, it may be difficult to arrange such an index server commonly shared by different business enterprises and organizations practically.

The respective MFDs 1 through n issue a search request for a designated document ID to all apparatuses of the network instead of providing the linkage apparatus address group retention portion 142. History information on the document ID is searched in the apparatuses on the network. It is possible to cover a method of realizing distributed arrangement of history information on the network. However, search efficiency is deteriorated.

While embodiments of the invention has been described in detail, the invention is not limited to such a specific exemplary embodiment, and various modifications and alterations may be made within the scope of claims of the invention. The document control method in accordance with an aspect of the invention is realized by the document management system 100.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A distributed and decentralized document management system including a first copier, a second copier, and a third copier, the second copier comprising:
    a creation portion that, in a case of copying an original document that includes an original document identifier and a first copier identifier that identifies the first copier that created the original document, creates a first derived document that includes a first derived document identifier and a second copier identifier that identifies the second copier, in the document management system, that creates the first derived document;
    a transmission portion that transmits the original document identifier and the second copier identifier to the first copier that created the original document;
    a receiving portion that receives the first derived document identifier and a third copier identifier that identifies the third copier, in the document management system, that further copies the first derived document;
    a memory portion that stores the original document identifier, the first copier identifier, the first derived document identifier, and the third copier identifier in relation to each other;
    a search portion that searches for a distribution path of the original document with the use of the association of the original document identifier, the first derived document identifier, and the third copier identifier; and a notification portion that conveys at least one information in the memory portion to a search requester when a search is conducted by the search portion, the copying, of the original document being performed by the second copier.

2. The distributed and decentralized document management system according to claim 1, wherein the at least one information is selected from the list including date and time when the original document is copied, an identifier of a person who copies the original document, and an operation type executed by the person who copies the original document, as an operation history.

3. The distributed and decentralized document management system according to claim 1, further comprising a display portion that displays a search result by the search portion.

4. A distributed and decentralized document management system comprising multiple copiers, each copier comprising:

a creation portion that, in a case of copying an original document that includes an original document identifier and a first copier identifier that identifies a first copier that created the original document, creates a first derived document that includes a first derived document identifier and a second copier identifier that identifies a second copier, in the document management system, that creates the first derived document;

a transmission portion that transmits the original document identifier and the second copier identifier to the first copier that created the original document;

a receiving portion that receives the first derived document identifier and a third copier identifier that identifies a third copier, in the document management system, that further copies the first derived document;

a memory portion that stores the original document identifier, the first copier identifier, the first derived document identifier, and the third copier identifier in relation to each other;

a search portion that searches for a distribution path of the original document with the use of the association of the original document identifier, the first derived document identifier, and the third copier identifier; and a notification portion that conveys at least one information in the memory portion to a search requester when a search is conducted by the search portion, the copying of the original document being performed by the second copier.

5. A distributed and decentralized document management method comprising:

creating, in a case of copying an original document that includes an original document identifier and a first copier identifier that identifies a first copier that created the original document, a first derived document that includes a first derived document identifier and a second copier identifier that identifies a second copier, in the document management system, that creates the first derived document;

transmitting the original document identifier and the second copier identifier to the first copier that created the original document;

receiving the first derived document identifier and a third copier identifier that identifies a third copier that further copies the first derived document;

storing the original document identifier, the first copier identifier, the first derived document identifier, and the third copier identifier in relation to each other;

searching for a distribution path of the original document with the use of the association of the original document identifier, the first derived document identifier, and the third copier identifier; and conveying at least one information to a search requester when a search is conducted, the copying of the original document being performed by the second copier.

6. A distributed and decentralized document management copier comprising:

a creation portion that, in a case of copying an original document that includes an original document identifier and a first copier identifier that identifies a first copier that created the original document, creates a first derived document that includes a first derived document identifier and a second copier identifier that identifies the document management copier that creates the first derived document;

a transmission portion that transmits the original document identifier and the second copier identifier to the first copier that created the original document;

a receiving portion that receives the first derived document identifier and a third copier identifier that identifies a third copier that further copies the first derived document;

a memory portion that stores the original document identifier, the first copier identifier, the first derived document identifier, and the third copier identifier in relation to each other;

a search portion that searches for a distribution path of the original document with the use of the association of the original document identifier, the first derived document identifier, and the third copier identifier; and a notification portion that conveys at least one information in the memory portion to a search requester when a search is conducted by the search portion, the copying, of the original document being performed by the second copier.

* * * * *